United States Patent [19]

Biek

[11] Patent Number: 4,650,377

[45] Date of Patent: Mar. 17, 1987

[54] RIGHT ANGLE DRILL

[75] Inventor: Paul A. Biek, Houston, Tex.

[73] Assignee: Dresser Industries, Inc., Dallas, Tex.

[21] Appl. No.: 707,926

[22] Filed: Mar. 4, 1985

[51] Int. Cl.[4] .............................................. B23B 47/18
[52] U.S. Cl. .................................... 408/130; 91/461;
91/533; 408/10; 408/702
[58] Field of Search ................... 408/137, 8, 9, 10, 13,
408/14, 15, 129, 130, 138, 141, 702; 91/304,
461, 533, 448

[56] References Cited

U.S. PATENT DOCUMENTS

| 3,487,729 | 1/1970 | Juhasz et al. | 408/14 |
|---|---|---|---|
| 3,512,433 | 5/1970 | Juhasz et al. | 408/138 |
| 3,512,434 | 5/1970 | Juhasz et al. | 408/138 |
| 4,083,646 | 4/1978 | Vindez | 408/14 |
| 4,111,590 | 9/1978 | Burkart et al. | 408/130 |
| 4,418,767 | 12/1983 | Vindez | 408/14 |
| 4,538,942 | 9/1985 | Vindez | 408/132 |

Primary Examiner—Gil Weidenfeld
Assistant Examiner—Daniel W. Howell

[57] ABSTRACT

An improved right angle drill including a pneumatically powered motor and feed and retract apparatus driven by the motor. The feed and retract apparatus includes a control valve for controlling the flow of pressurized air to the motor and to the feed and retract apparatus to automatically stop the feed motion, to automatically stop the retract motion, and to stop the drill completely.

6 Claims, 10 Drawing Figures

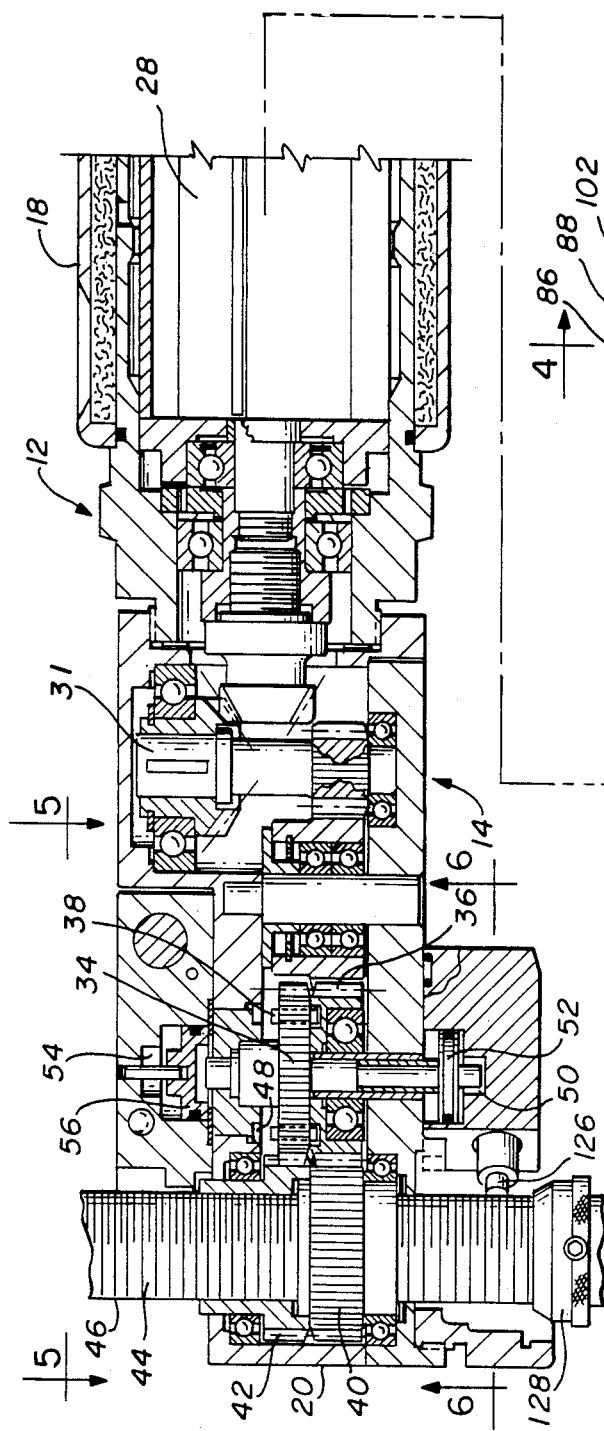
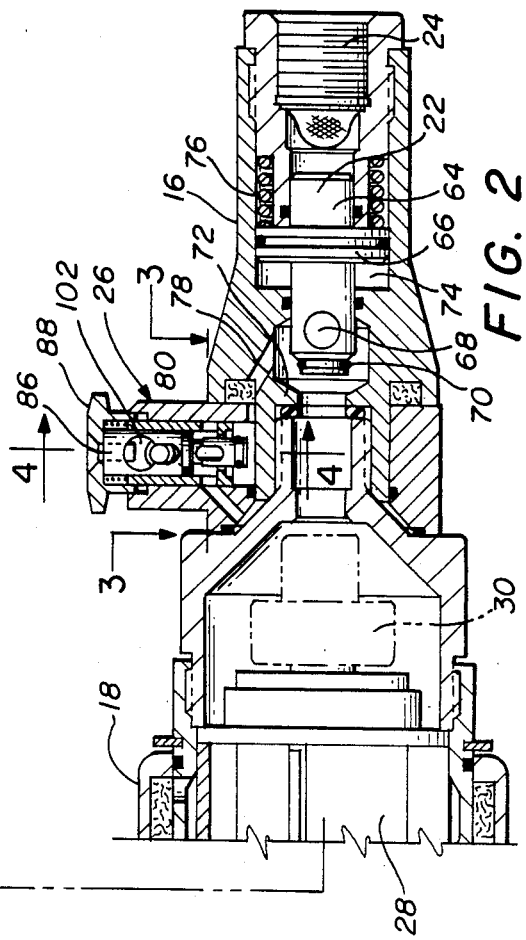
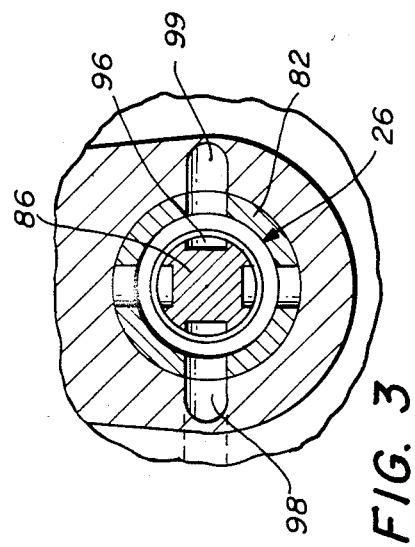
FIG. 2
FIG. 3

4,650,377

RIGHT ANGLE DRILL

BACKGROUND OF THE INVENTION

This invention relates generally to improved right angle drills. More particularly, but not by way of limitation, this invention relates to an improved right angle drill including control apparatus for automatically stopping the feed and retract motions when the ends of the feed and retract motions have been reached.

Right angle drills include apparatus for causing the drill spindle to move in reciprocating motion (feed and retract) that is in a direction perpendicular to the longitudinal axis of the drill to accomplish the desired drilling operation. It is necessary to limit such motion and to cause the motion to either stop or change to the other motion to avoid damage to the drill.

Initially, the motion of such drills was, in part, manually controlled, that is, the drill operator started the motor, engaged the feed, and subsequently stopped the drill when the end of the retract motion was reached. If the operator was not present when the end of the retract motion was reached, damage could occur to the drill.

SUMMARY OF THE INVENTION

An object of this invention is to provide an improved right angle drill that automatically feeds when the motor is started, automatically reverses from "feed" to "retract," and automatically shuts off at the end of the "retract" motion to prevent damage to the drill.

Accordingly, this invention provides an improved, pneumatically powered, right angle drill including a housing, an air motor in the housing having an output shaft connected through a gear reduction system to a drill spindle reciprocably movable in feed and retract motions. A differential drive gear is driven by the output shaft and a retract gear is movable between a feed position wherein the retract gear is rotatable with the differential drive gear and a retract position wherein the retract gear ceases rotation and the drive gears continue to rotate the spindle causing the spindle to retract. Retract control means is provided for moving the retract gear between the positions. Flow valve means in the housing controls the flow of air to the motor; and control valve means in the housing controls the flow of air to and from the retract control means and controls the flow valve means thereby controlling the flow of air to the motor.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 2 is an enlarged, vertical cross-sectional view of the drill of FIG. 1 taken substantially along the line 2—2 of FIG. 1.

FIG. 3 is an enlarged fragmentary view taken substantially along the line 3—3 of FIG. 2.

DETAILED DESCRIPTION OF THE PREFERRED EMBODIMENT

Figure 1:
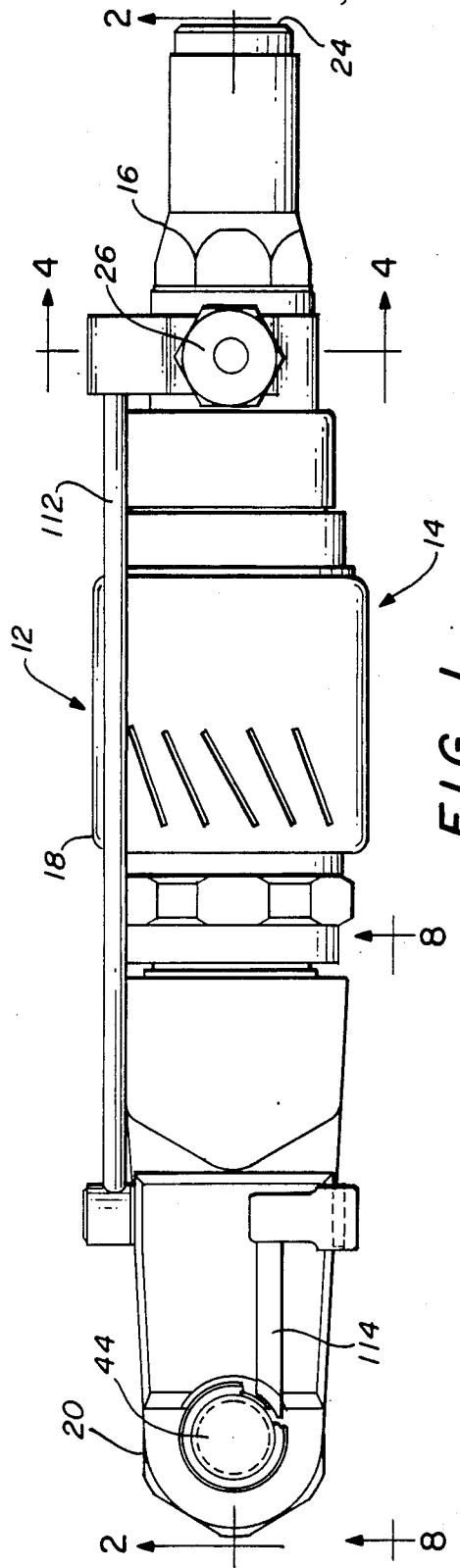
FIG. 1 is a top plan view of a right angle drill that is constructed in accordance with the invention.

Referring to the drawing and to FIG. 1 in particular, shown therein and generally designated by the reference character 12, is a right angle drill that is constructed in accordance with the invention. The drill 12 includes a housing 14 comprising an inlet or control end portion 16, a motor and gear housing portion 18, and a drill head portion 20.

In FIG. 2, it can be seen that the control portion 16 of the housing 14 includes a main flow control valve 22 located adjacent to an inlet 24 that is arranged to be connected with a source of pressurized air (not shown). The control end portion 16 also includes a control valve 26 that will be described in detail hereinafter.

The end portion 16 is threadedly connected to the motor and gear portion 18. Contained within the motor and gear portion 18 is an air motor 28, a governor 30 (shown in dash lines) and a gear reduction 31. The gear reduction 31 is connected with the motor 28 by an output shaft 32.

The head portion 20 of the housing 14 includes a retract gear 34 that is located on a common shaft with a differential drive gear 36. As shown in FIG. 2, the retract gear is releasably connected for movement with the differential drive gear 36 by a plurality of pins 38.

The differential drive gear 36 is in mesh with a spindle drive gear 40 and the retract gear 34 is in mesh with a spindle feed gear 42. The gears 40 and 42 are carried by a drill spindle 44 that has a threaded exterior 46.

The spindle drive gear 40 operates on and is connected to the spindle 44 through a key/key slot arrangement (not shown) so that the gear 40 always rotates at the same speed and with the spindle 44. The spindle feed gear 42, which is driven by the retract gear 34, rotates incrementally faster than the spindle and spindle drive gear 40 when the retract gear 34 and differential drive gear 36 are locked together by the pins 38 and the spindle 44 is fed downwardly. However, when the retract gear is moved upwardly and the pins 38 are located in recesses 48 in the housing 14, the retract gear 34 and the spindle feed gear 42 stop rotating and the drill spindle 44 is caused to retract.

The housing portion 20 includes a retract cylinder 50 having a retract piston 52 mounted therein. It can be seen that air pressure applied in the cylinder 50 will cause the retract piston 52 to move up, moving the retract gear 34 upwardly into the retract position.

Similarly, a feed cylinder 54 is provided in the housing 14 and a feed piston 56 is located therein. The feed piston 56 will positively force the retract gear downwardly into locked relationship with the drive gear 36 causing the drill spindle 44 to feed.

Figure 7:
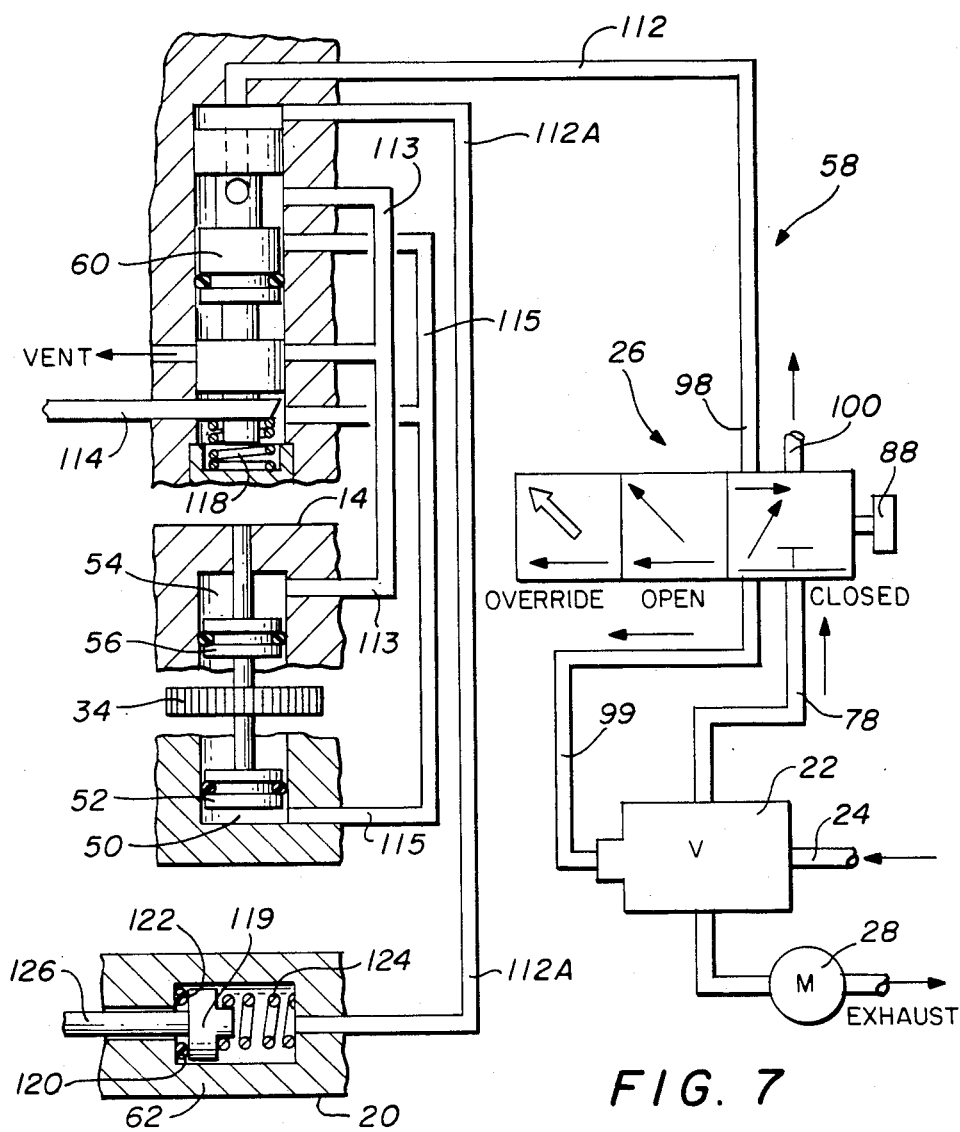
FIG. 7 is a schematic diagram of a control system utilized in the drill of FIG. 1.

The control system utilized to position the retract gear 34 is schematically illustrated in FIG. 7 and is designated by the reference character 58. Generally, the system 58 includes the flow control valve 22, the control valve 26, the retract piston 52, the feed piston 56, a retract control valve 60 and a vent valve 62. Each of these items is shown in detail in the various figures which will be described.

The flow control valve is illustrated in FIG. 2 and includes a hollow body 64 having a radially projected flange 66 thereon. The left most end of the valve 22, as seen in FIG. 2, is ported at 68 and carries an O-ring seal 70 that is engageable with a valve seat 72 in the housing portion 60. The flange 66 is disposed in a chamber 74 in the housing portion 16. Spring 76 continually biases the valve 22 toward a position wherein the seal 70 is in engagement with the seat 72, that is, toward the closed position.

The body 64 and flange 66 thereon in conjunction with the seals 77 define a piston having different areas exposed to the same pressure with the larger area being on the flange 66 in the chamber 74 so that the valve 22 can be opened, and held open, by air pressure. In the closed position, pressurized air can flow through the valve 22 and outwardly through the ports 68, through a passageway 78 in the housing portion 16 and into bore 80 that is provided for the control valve 26.

Figure 4:
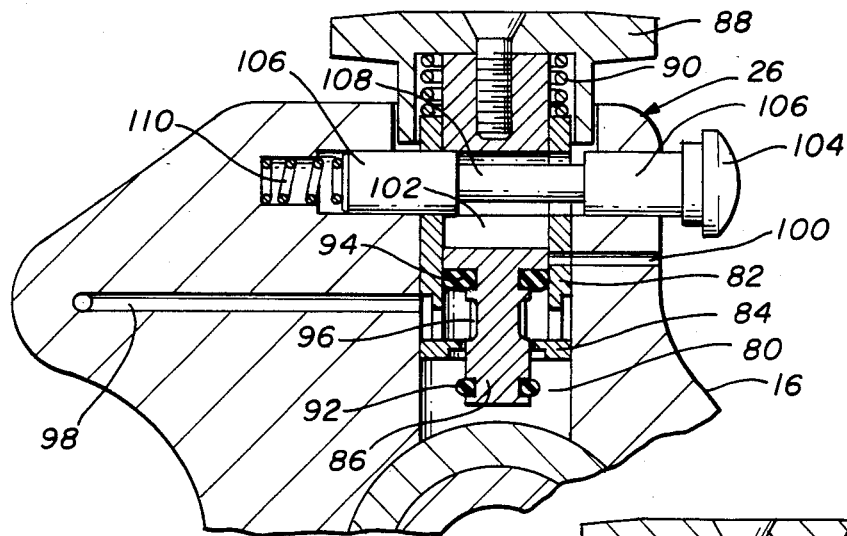
FIG. 4 is an enlarged fragmentary view taken substantially along the line 4—4 of FIG. 2.

The structure of the control valve 26 can be more readily understood from FIGS. 2, 3 and 4. The valve 26 includes a bushing 82 that is disposed in the bore 80. The bushing 82 includes a control valve seat 84 that loosely encircles a control valve member 86.

The control valve member is movably positioned within the bushing 82. At its uppermost end the control valve member 86 is provided with a cap 88 and a spring 90 encircling the control valve member 86 that biases the control valve member 86 upwardly in the bushing 82. As shown most clearly in FIG. 4, an O-ring seal 92 carried on the lower end of the control valve member 86 is biased by the spring 90 toward the valve seat 84. A second O-ring seal 94 encircles the control valve member 86 relatively above the seat 84.

Located between the seals 92 and 94 are a plurality of recesses 96 that may be more clearly seen in FIG. 3. It will be appreciated that when such recesses 96 are located adjacent to the seat 84, a substantially larger flow passageway between the seat 84 and the valve member 86 is provided. Located in the housing portion 16 and just above the seat 84 is a control passageway 98 for purposes which will become more apparent hereinafter. A second control passageway 99 extends through the housing from the valve 26 to the chamber 74. Located in the housing portion 16 and just above the seal 94, as shown in FIG. 4, is a vent passageway 100.

The control valve is a three position valve. To lock the valve 26 in the open position, the valve member 86 is provided with key hole 102 (see FIGS. 2 and 4). A lock pin 104 extends through the bushing 82 and through the key hole 102. The lock pin 104 has large diameter portions 106 sized to slide through the larger portion of the key hole, but not through the smaller portion of the key hole. The pin 104 is also provided with a smaller diameter portion 108 that is sized to enter into the smaller portion of the key hole 102. A spring 110 biases the lock pin 104 outwardly so that the lock pin 104 will tend to be disposed in the larger portion of the key hole 102.

As shown in FIG. 1 and to connect the control valve 26 with the retract control valve 60, a conduit 112 extends from the valve 26, that is, from the control passageway 98 to the retract control valve 60 and to the vent valve 62 which are located in the head portion 20 of housing 14 and through conduit 112 to the vent valve 62. The retract control valve 60 is a two position valve that provides pressurized air through internal passageways (not shown) to the feed cylinder 54, while venting the retract cylinder 50 when in one position. In the other position, the retract control valve supplies pressurized air to the retract cylinder 50, while venting the feed cylinder 54. In either position, the control valve 60 supplies pressurized air to the vent valve 62 through conduit 112A.

The position of the valve 60 is controlled by a valve latch or lever 114 that is pivotally mounted on the end portion 20 of the housing 14. The lever projects into proximity with the drill spindle 44 so that it is engaged by a collar 116 located on the drill spindle 44 when the drill spindle 44 reaches the lower end of its feed motion. A spring 118 located in the housing portion 20 urges the valve 60 toward the feed position.

As previously mentioned, the pressurized air is supplied by the conduit 112A to the vent valve 62. The vent valve 62 is also located in the housing portion 20 and includes a valve member 119 which carries an O-ring seal 120 thereon. The valve member 119 is movable toward and away from the valve seat 122 formed in the housing portion 20. A spring 124 continually biases the vent valve member 119 toward the seat 122.

Figure 6:
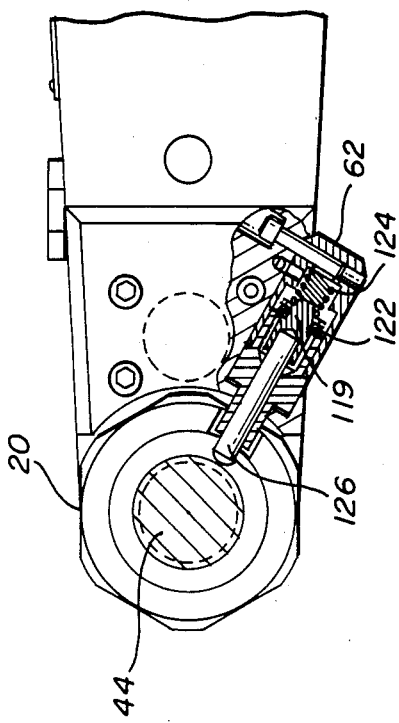
FIG. 6 is an enlarged, fragmentary view illustrating a vent valve utilized in the drill of FIG. 1.

Projecting from the opposite side of the valve member 119 is a valve stem 126. The valve stem 126 is located (as can be seen in FIG. 6) proximate the drill spindle 44 under the housing portion 20 and is arranged to engage a collar 128 that is carried by the drill spindle 44. The collar 128 is adjusted on the spindle 44 so that it will engage the valve stem 126 as the spindle 44 reaches the uppermost end of its retract motion.

OPERATION OF THE PREFERRED EMBODIMENT

The inlet 24 of drill 12 is connected to the source of pressurized air (not shown). The operator of the drill 12 depresses the button 88 on the control valve 26 moving the plunger 86 downwardly to the open position illustrated in FIG. 4. The spring 110 moves the lock pin 104 into the key hole 102 so that the control valve 26 is locked in the open position.

With the control valve 26 in the open position, air flows through the flow valve 22 and outwardly through ports 68 therein past the open valve 26 and through passageway 99 to the chamber 74. Upon reaching the chamber 74, the pressurized air displaces the flow valve 22 to the right, as illustrated in FIG. 2, opening the main flow passageway so that the pressurized air will flow directly to the motor 28.

The pressurized air also flows from the control valve through passageway 98 and conduit 112 to the retract control valve 60 and into the closed vent valve 62. With the retract lever 114 in the position blocking movement of the valve 60, the pressurized air is directed through the conduit 113 to the feed cylinder 54.

The pressurized air in the feed cylinder 54 drives the feed piston 56 downwardly moving the retract gear 34 and the pins 38 into the differential drive gear 36 so that the retract gear 34 and differential drive gear 36 rotate at the same speed causing the spindle 44 to move downwardly.

Figure 8:
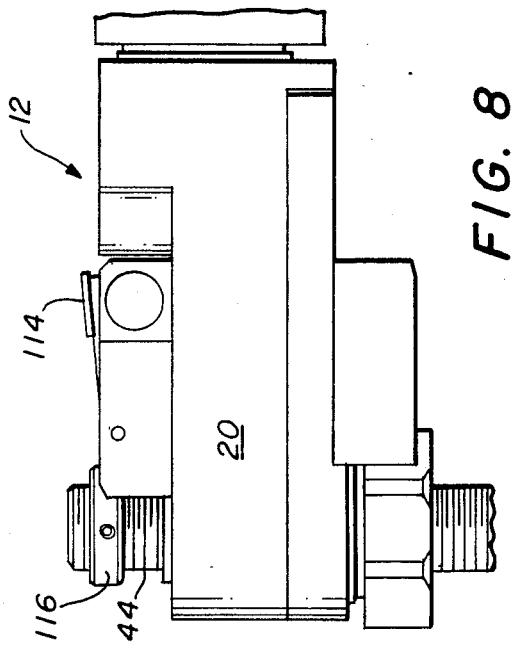
FIG. 8 is a partial, vertical elevation view of the drill of FIG. 1.

The spindle 44 continues its downward or feed movement until the collar 116 carried thereby engages the lever 114 as shown in FIG. 8. The lever 114 is moved out of engagement with the retract control valve 60 and the retract valve 60 moves into a position wherein the pressurized air is supplied through the conduit 115 to the retract cylinder 50. Air in the retract cylinder 50 drives the retract piston 52 upwardly moving the retract gear 34 upwardly until the pins 38 carried thereby engage the recesses 48 in the housing 14. When this occurs, rotation of the retract gear and the spindle feed gear cease, while the differential drive gear 36 continues to rotate. This causes the rotating spindle 44 to start its upwardly or "retract" motion.

The retract motion continues until the collar 128 carried by the spindle 44 engages the plunger 126 on the vent valve 62. Such engagement moves the vent valve 62 into the venting position dumping the air from the control valve 60, conduit 112, passageway 98, and ultimately from the chamber 74, permitting the flow valve 22 to return to the closed position and shutting off the flow of air to the motor 28. Thus, further movement of the spindle 44 is prevented.

Figure 10:
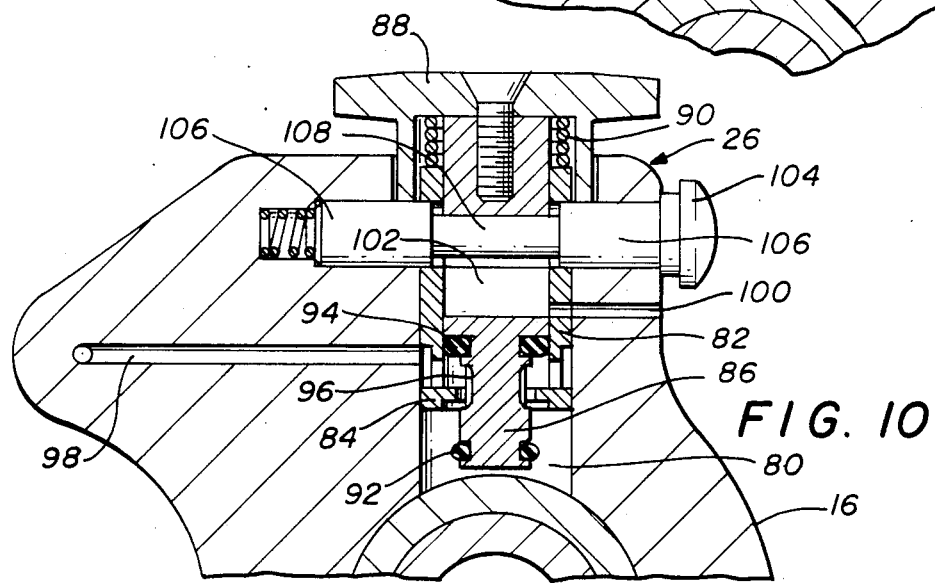
FIG. 10 is a cross-sectional view similar to FIG. 4 but illustrating the control valve in still another operating position.
Figure 5:
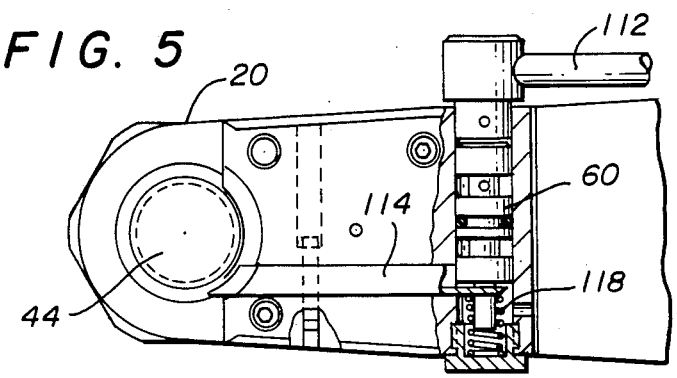
FIG. 5 is a fragmentary view illustrating a retract control valve utilized in the drill of FIG. 1 that is constructed in accordance with the invention.

It it is desired to place the drill in feed condition again, the operator depresses the cap 88 to move the valve member 86 downwardly slightly to the position illustrated in FIG. 10. In this position, the recesses 96 are located adjacent to the valve seat 84 and provide a substantially increased flow area past the seat 84. The supply of pressurized air flowing thereby is adequate to override the venting from the vent valve 62 and to move the retract gear 34 downwardly into engagement with the differential drive gear 36 returning the drill to the feed condition and, subsequently, closing the vent valve 62. The drill is in the initial feed condition.

Figure 9:
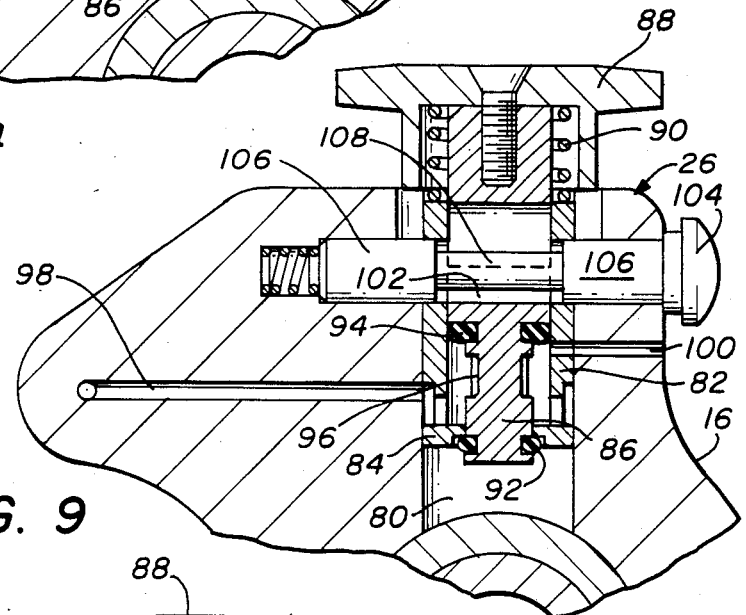
FIG. 9 is a vertical, cross-sectional view similar to FIG. 4, but illustrating the control valve in a different operating position.

In the event that the operator wishes to stop the operation of the drill, it is only necessary to move the lock pin 104 into the position wherein the small diameter 108 thereon is aligned with the small portion of the key hole 102. When this occurs, the spring 90 drives the valve member 86 upwardly until the seal member 92 engages the valve seat 84 totally shutting off the flow through the valve 26. Simultaneously, the O-ring seal 94 carried by the valve member 86 has moved upwardly past the vent passageway 100. (This condition of the valve 26 is illustrated by FIG. 9.) The vent passageway 100 is of adequate size to provide venting of the various downstream controls as well as to vent the chamber 74 which permits the main flow valve 22 to close, stopping the operation of the motor 28.

From the foregoing detailed description, it will be appreciated that the drill and control valve apparatus described herein provides for the automatic operation of a pneumatic tool having a reciprocating feed and retract motion with automatic stop after retract is complete. The apparatus prevents inadvertent damage to the tool even though the operator should not be present at the end of the retract motion. Also, the control valve apparatus provides for the rapid closure of the main valve in the event that it should become necessary or desirable to stop the tool.

Having described but a single embodiment of the invention, it will be undersood that many changes and modifications can be made thereto without departing from the spirit and scope of the annexed claims.

What is claimed is:

1. An improved pneumatically powered right angle drill including a housing, an air motor therein having an output shaft connected through a gear reduction system located in said housing to a drill spindle reciprocably movable in feed and retract motions, the improvement comprising:
   a drive gear driven by said output shaft;
   a retract gear movable between a feed position wherein said retract gear is rotatable with said drive gear and a retract position wherein said drive gear rotates relative to said retract gear;
   retract control means for moving said retract gear between said positions;
   flow valve means in said housing for controlling the flow of air to said motor;
   control valve means in said housing for controlling flow of air to and from said retract control means thereby controlling the flow of air to said motor; and,
   wherein said control valve means includes a valve body having an inlet, outlet and an annular valve seat therebetween;
   a valve member located in said body and movable from an open position wherein air is supplied to said flow valve means to open said flow valve means admitting air to said motor and to said retract control means, to a closed position wherein air is vented from said flow valve means and from said retract gear control means, to close said flow valve means shutting off air to said motor and to said retract control means, and to an override position wherein air is supplied to said flow valve means to open said flow valve means admitting air to said motor and simultaneously supplying a large volume of air to said retract control means overriding said retract control means, said valve member and said valve seat forming an annular flow passageway whereby air can flow thereby and having a plurality of recessed areas therein, said areas being disposed adjacent to said seat when said valve member is in said override position for significantly increasing the flow passageay area therebetween; and,
   a seal member carried by said valve member for sealingly engaging said valve seat when said valve member is in said closed position preventing flow through said control valve means.

2. The drill of claim 1 wherein said retract control means includes:
   a feed cylinder in said housing;
   a feed piston located in said feed cylinder for reciprocal movement and engageable with said retract gear to move said retract fear to said feed position;
   a retract cylinder in said housing;
   a retract piston reciprocably located in said retract cylinder and engageable with said retract gear to move said retract gear to said retract position; and,
   means connecting said retract control means with said control valve means for supplying air selectively to said retract cylinder and feed cylinder.

3. The drill of claim 2 and also including a vent valve connected with said retract control means for venting air pressure from said retract control means and said retract cylinder.

4. The drill of claim 3 wherein said vent valve is located in housing and includes:
   an annular vent valve seat in said housing;
   a vent valve member movable toward and away from said vent valve seat to close and open said vent valve, respectively, said vent valve member including a valve stem projecting therefrom and engageable with the drill spindle when said drill spindle has reached the end of the retract motion to vent said feed cylinder and control valve means causing said flow control valve to close; and, resilient means in said housing urging said vent valve member to the closed position.

5. The drill of claim 3 wherein said retract control means also includes a retract control valve in said housing connected with said control valve means, retract cylinder, feed cylinder and with said vent valve for selectively directing the flow of air thereto.

6. The drill of claim 5 wherein said retract control valve includes:

a retract valve member located in said housing for movement from a feed position wherein air is directed to said feed cylinder to a retract position wherein air is directed to said retract cylinder;

resilient means biasing said retract valve member toward said feed position, and, a latch arm pivotally mounted on said housing having one end engaging said retract valve member to hold said member in the feed position and having a second end engageable with said drill spindle when said drill spindle reaches the end of the feed motion to disengage said latch arm from said retract valve member whereupon said retract valve member shifts to said retract position and air is directed to said retract cylinder.

* * * * *